US012764341B2

(12) United States Patent
Deshpande

(10) Patent No.: US 12,764,341 B2
(45) Date of Patent: Oct. 13, 2026

(54) SYSTEMS AND METHODS FOR SIGNALING TEXT DESCRIPTION PURPOSE AND IDENTIFIER INFORMATION IN VIDEO CODING

(71) Applicant: SHARP KABUSHIKI KAISHA, Sakai City (JP)

(72) Inventor: Sachin G. Deshpande, Vancouver, WA (US)

(73) Assignee: Sharp Kabushiki Kaisha, Sakai City (JP)

( * ) Notice: Subject to any disclaimer, the term of this patent is extended or adjusted under 35 U.S.C. 154(b) by 0 days.

(21) Appl. No.: 19/234,462

(22) Filed: Jun. 11, 2025

(65) Prior Publication Data

US 2026/0025526 A1 Jan. 22, 2026

Related U.S. Application Data

(60) Provisional application No. 63/672,436, filed on Jul. 17, 2024.

(51) Int. Cl.
*H04N 19/70* (2014.01)
*H04N 19/44* (2014.01)

(52) U.S. Cl.
CPC ............. *H04N 19/70* (2014.11); *H04N 19/44* (2014.11)

(58) Field of Classification Search
CPC ............................... H04N 19/70; H04N 19/44
See application file for complete search history.

(56) References Cited

FOREIGN PATENT DOCUMENTS

WO WO-2025219777 A1 * 10/2025 ............. H04N 19/70
WO WO-2026010325 A1 * 1/2026 ........... H04N 19/136

OTHER PUBLICATIONS

ITU-T H.264 “Advanced video coding for generic audiovisual services” (Oct. 2016).
ITU-T H.265 “High Efficiency video coding” (Nov. 2019).
ITU-T H.266 “Versatile Video Coding” (Apr. 2022).
Algorithm Description of Enhanced Compression Model 12 (ECM 12), ISO/IEC JTC1/SC29, Document: JVET-AG2025, Jan. 17-26, 2024, Teleconference.
ITU-T H.274 “Versatile supplemental enhancement information messages for coded video bitstreams” (May 2022).
“Additional SEI messages for VSEI version 4 (Draft 2)” 34th Meeting of ISO/IEC JTC1/SC29, Apr. 17-24, 2024, Rennes, FR, document JVET-AH2006-v1.
Deshpande “AHG9: Comments on Text Description Information SEI Message,” ISO/IEC JTC1/SC29, Document: JVET-AI0059-v1, 35th Meeting, Sapporo, JP, Jul. 12-19, 2024, pp. 1-4.

* cited by examiner

*Primary Examiner* — Shadan E Haghani
(74) *Attorney, Agent, or Firm* — J. Fish Law, PLLC

(57) ABSTRACT

A device may be configured to decode video data based on information included in a text description information message. In one example, a text description information message includes a syntax element indicating that the text description information message cancels a persistence of a previous text description information message with the same purpose as the text description information message. In one example, a text description information message includes a syntax element indicating that the text description information message cancels a persistence of a previous text description information message with the same identifier value as the text description information message.

3 Claims, 6 Drawing Sheets

SYSTEMS AND METHODS FOR SIGNALING TEXT DESCRIPTION PURPOSE AND IDENTIFIER INFORMATION IN VIDEO CODING

RELATED APPLICATIONS

This application claims the benefit of U.S. Provisional Application No. 63/672,436, filed on Jul. 17, 2024, which is incorporated by reference in its entirety.

TECHNICAL FIELD

This disclosure relates to video coding and more particularly to techniques for signaling text description purpose information for coded video.

BACKGROUND

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards also define the decoding process and decoders that follow the decoding process can be said to be conforming decoders. Video coding standards may incorporate video compression techniques. Examples of video coding standards include ISO/IEC MPEG-4 Visual and ITU-T H.264 (also known as ISO/IEC MPEG-4 AVC), High-Efficiency Video Coding (HEVC), and Versatile video coding (VVC). HEVC is described in High Efficiency Video Coding, Rec. ITU-T H.265, November 2019, which is referred to herein as ITU-T H.265. VVC is described in Versatile Video Coding, Rec. ITU-T H.266, April 2022, which is incorporated by reference, and referred to herein as ITU-T H.266. Extensions and improvements for ITU-T H.266 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized enhanced video coding technology beyond the capabilities of the VVC standard. The Enhanced Compression Model 12 (ECM 12), Algorithm Description of Enhanced Compression Model 12 (ECM 12), ISO/IEC JTC1/SC29 Document: JVET-AG2025, 17-26 Jan. 2024, Teleconference, which is incorporated by reference herein, describes the coding features that were under coordinated test model study by as potentially enhancing video coding technology beyond the capabilities of ITU-T H.266. It should be noted that the coding features of ECM 12 are implemented in ECM reference software. As used herein, the term ECM may collectively refer to algorithms included in ECM 12 and implementations of ECM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY

In general, this disclosure describes various techniques for coding video data. In particular, this disclosure describes techniques for signaling source picture timing information in video coding. It should be noted that although techniques of this disclosure are described with respect to ITU-T H.264, ITU-T H.265, ITU-T H.266, and ECM, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.264, ITU-T H.265, ITU-T H.266, and ECM. Thus, reference to ITU-T H.264, ITU-T H.265, ITU-T H.266, and/or ECM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of encoding video data comprises signaling a text description information message including a first syntax element indicating a purpose of the text description information message, a second syntax element indicating that the text description information message cancels a persistence of a previous text description information message with the same purpose as the text description information message, and conditionally including a third syntax element and a fourth syntax element, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

In one example, a device comprises one or more processors configured to signal a text description information message including a first syntax element indicating a purpose of the text description information message, a second syntax element indicating that the text description information message cancels a persistence of a previous text description information message with the same purpose as the text description information message, and conditionally including a third syntax element and a fourth syntax element, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

In one example, a non-transitory computer-readable storage medium comprises instructions stored thereon that, when executed, cause one or more processors of a device to signal a text description information message including a first syntax element indicating a purpose of the text description information message, a second syntax element indicating that the text description information message cancels a persistence of a previous text description information message with the same purpose as the text description information message, and conditionally including a third syntax element and a fourth syntax element, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

In one example, an apparatus comprises means for signaling a text description information message including a first syntax element indicating a purpose of the text description information message, a second syntax element indicating that the text description information message cancels a persistence of a previous text description information message with the same purpose as the text description information message, and conditionally including a third syntax element and a fourth syntax element, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

In one example, a method of decoding video data comprises receiving a text description information message, parsing a first syntax element in the text description information message indicating a purpose of the text description information message, parsing a second syntax element in the text description information message indicating that the text description information message cancels a persistence of a previous text description information message with the same purpose as the text description information message, and conditionally parsing a third syntax element and a fourth syntax element in the text description information message, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

In one example, a device comprises one or more processors configured to receive a text description information message, parse a first syntax element in the text description information message indicating a purpose of the text description information message, parse a second syntax element in the text description information message indicating that the text description information message cancels a persistence of a previous text description information message with the same purpose as the text description information message, and conditionally parse a third syntax element and a fourth syntax element in the text description information message, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

In one example, a non-transitory computer-readable storage medium comprises instructions stored thereon that, when executed, cause one or more processors of a device to receive a text description information message, parse a first syntax element in the text description information message indicating a purpose of the text description information message, parse a second syntax element in the text description information message indicating that the text description information message cancels a persistence of a previous text description information message with the same purpose as the text description information message, and conditionally parse a third syntax element and a fourth syntax element in the text description information message, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

In one example, an apparatus comprises means for receiving a text description information message, means for parsing a first syntax element in the text description information message indicating a purpose of the text description information message, means for parsing a second syntax element in the text description information message indicating that the text description information message cancels a persistence of a previous text description information message with the same purpose as the text description information message, and means for conditionally parsing a third syntax element and a fourth syntax element in the text description information message, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

The details of one or more examples are set forth in the accompanying drawings and the description below. Other features, objects, and advantages will be apparent from the description and drawings, and from the claims.

DETAILED DESCRIPTION

Figure 1:
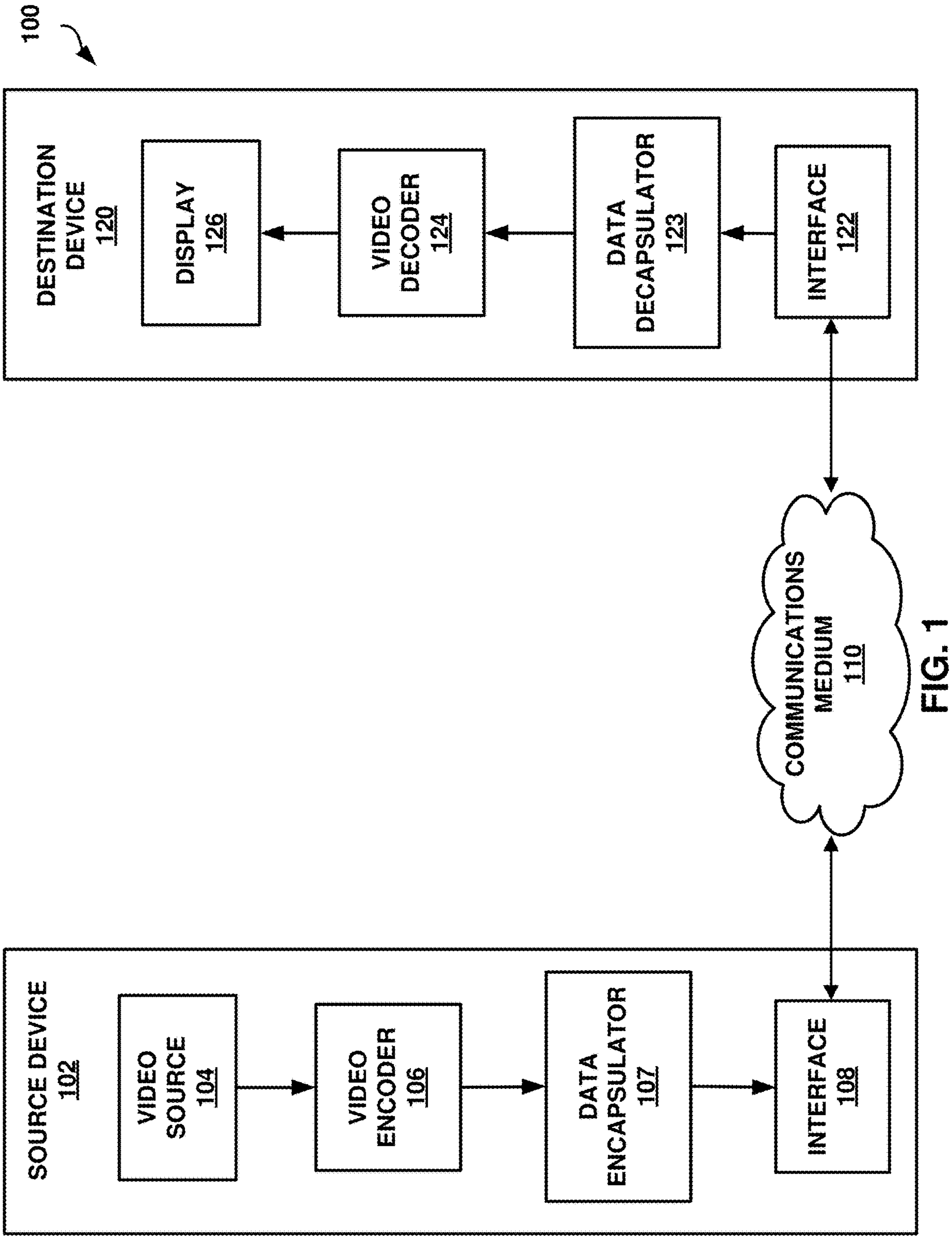
FIG. 1 is a block diagram illustrating an example of a system that may be configured to encode and decode video data according to one or more techniques of this disclosure.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. It should be noted that in some cases, the terms luma and luminance are used interchangeably.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, intra prediction data (e.g., intra prediction mode syntax elements) or inter prediction data (e.g., motion data syntax elements) corresponding to a PB is used to produce reference and/or predicted sample values for the PB. ITU-T H.266 specifies a CTU having a maximum size of 128×128 luma samples. In ITU-T H.266, CTUs are partitioned according a quadtree plus multi-type tree (QTMT or QT+MTT) structure. The QTMT structure in ITU-T H.266 enables quadtree leaf nodes to be further partitioned by a binary tree (BT) structure. That is, in ITU-T H.266, quadtree leaf nodes may be recursively divided vertically or horizontally. Further, in ITU-T H.266, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to ITU-T H.266, slices are required to consist of an integer number of complete tiles or an integer number of consecutive complete CTU rows within a tile, instead of only being required to consist of an integer number of CTUs. It should be noted that in ITU-T H.266, the slice design does not include slice segments (i.e., no independent/dependent slice segments). Thus, in ITU-T H.266, a picture may include a single tile, where the single tile is contained within a single slice or a picture may include multiple tiles where the multiple tiles (or CTU rows thereof) may be contained within one or more slices. In ITU-T H.266, the partitioning of a picture into tiles is specified by specifying respective heights for tile rows and respective widths for tile columns. Thus, in ITU-T H.266 a tile is a rectangular region of CTUs within a particular tile row and a particular tile column position. Further, it should be noted that ITU-T H.266 provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, as described in further detail below, a bitstream of coded video data includes a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 2:
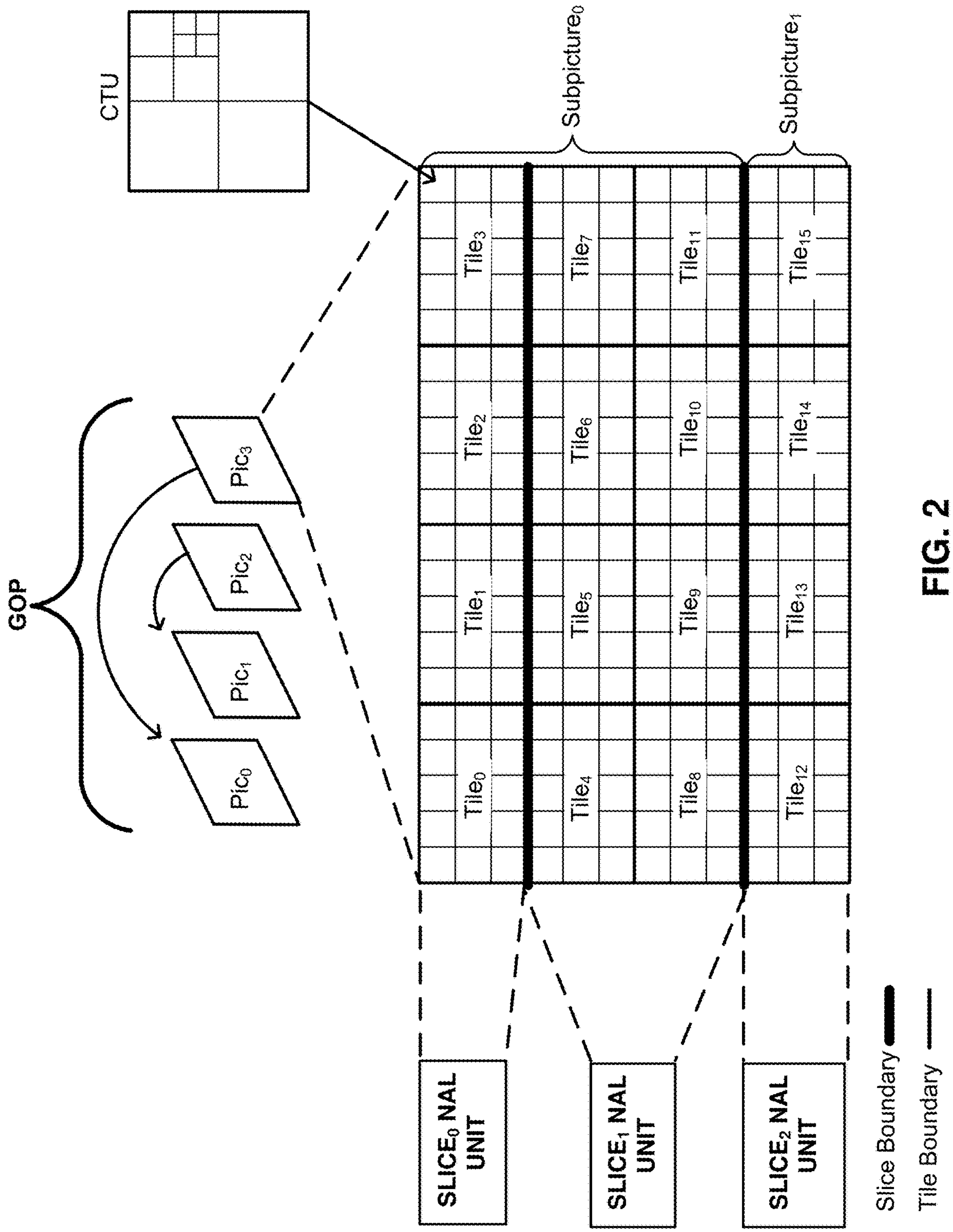
FIG. 2 is a conceptual diagram illustrating coded video data and corresponding data structures according to one or more techniques of this disclosure.

FIG. 2 is a conceptual diagram illustrating an example of a picture within a group of pictures partitioned according to tiles, slices, and subpictures. It should be noted that the techniques described herein may be applicable to tiles, slices, subpictures, sub-divisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 2, $Pic_3$ is illustrated as including two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By using organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_1$ NAL unit may be decoded and displayed. The encapsulation of slices of a picture into respective NAL unit data structures and sub-bitstream extraction are described in further detail below.

As described above, a video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. As described above, a CU is typically defined according to the number of horizontal and vertical luma samples. Thus, a 16×16 CU formatted according to the 4:2:0 sample format includes 16×16 samples of luma components and 8×8 samples for each chroma component. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In ITU-T H.266, defined possible intra-prediction modes include a planar prediction mode, a DC prediction mode, and 65 angular prediction modes. Further, in ITU-T H.266, additional intra prediction tools, such as, for example, intra subpartition mode and matrix-based intra prediction are enabled. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). Further, in ITU-T H.266, the following inter prediction modes are enabled: the affine motion model, adaptive motion vector resolution, bi-directional optical flow, decoder side-motion vector refinement and geometric partitioning mode.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.266, when a picture is decoded it is stored to a decoded picture buffer (DPB) (which may be referred to as frame buffer, a reference buffer, a reference picture buffer, or the like). In ITU-T H.266, pictures stored to the DPB are removed from the DPB when they been output and are no longer needed for coding subsequent pictures. In ITU-T H.266, a determination of whether pictures should be removed from the DPB is invoked once per picture, after decoding a slice header, i.e., at the onset of decoding a picture. For example, referring to FIG. 2, $Pic_2$ is illustrated as referencing $Pic_1$. Similarly, $Pic_3$ is illustrated as referencing $Pic_0$. With respect to FIG. 2, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown) and assuming $Pic_1$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and ITU-T H.266, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

As described above, video content includes video sequences comprised of a series of pictures and each picture may be divided into one or more regions. In ITU-T H.266, a coded representation of a picture comprises VCL NAL units of a particular layer within an AU and contains all CTUs of the picture. For example, referring again to FIG. 2, the coded representation of $Pic_3$ is encapsulated in three coded slice NAL units (i.e., $Slice_0$ NAL unit, $Slice_1$ NAL unit, and $Slice_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in ITU-T H.266, a NAL unit may be a VCL NAL unit or a non-VCL NAL unit. It should be noted that a VCL NAL unit includes slice header data, which provides information used for decoding the particular slice. Thus, in ITU-T H.266, information used for decoding video data, which may be referred to as metadata in some cases, is not limited to being included in non-VCL NAL units. ITU-T H.266 provides where a picture unit (PU) is a set of NAL units that are associated with each other according to a specified classification rule, are consecutive in decoding order, and contain exactly one coded picture and where an access unit (AU) is a set of PUs that belong to different layers and contain coded pictures associated with the same time for output from the DPB. ITU-T H.266 further provides where a layer is a set of VCL NAL units that all have a particular value of a layer identifier and the associated non-VCL NAL units. Further, in ITU-T H.266, a PU consists of zero or one PH NAL units, one coded picture, which comprises of one or more VCL NAL units, and zero or more other non-VCL NAL units. Further, in ITU-T H.266, a coded video sequence (CVS) is a sequence of AUs that consists, in decoding order, of a CVSS AU, followed by zero or more AUs that are not CVSS AUs, including all subsequent AUs up to but not including any subsequent AU that is a CVSS AU, where a coded video sequence start (CVSS) AU is an AU in which there is a PU for each layer in the CVS and the coded picture in each present picture unit is a coded layer video sequence start (CLVSS) picture. In ITU-T H.266, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in ITU-T H.266, a bitstream may be described as including a sequence of AUs forming one or more CVSs.

Multi-layer video coding enables a video presentation to be decoded/displayed as a presentation corresponding to a base layer of video data and decoded/displayed one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In ITU-T H.266, each of a video sequence, a GOP, a picture, a slice, and CTU may be associated with metadata that describes video coding properties and some types of metadata are encapsulated in non-VCL NAL units. ITU-T H.266 defines parameters sets that may be used to describe video data and/or video coding properties. In particular, ITU-T H.266 includes the following four types of parameter sets: video parameter set (VPS), sequence parameter set (SPS), picture parameter set (PPS), and adaption parameter set (APS), where a SPS applies to apply to zero or more entire CVSs, a PPS applies to zero or more entire coded pictures, an APS applies to zero or more slices, and a VPS may be optionally referenced by a SPS. A PPS applies to one or more individual coded picture(s) that refers to it. In ITU-T H.266, parameter sets may be encapsulated as a non-VCL NAL unit and/or may be signaled as a message. ITU-T H.266 also includes a picture header (PH) which is encapsulated as a non-VCL NAL unit when signaled in its own NAL unit, or as part of a VCL NAL unit when signaled in the slice header of a coded slice. In ITU-T H.266, a picture header applies to all slices of a coded picture. ITU-T H.266 further enables decoding capability information (DCI) and supplemental enhancement information (SEI) messages to be signaled. In ITU-T H.266, DCI and SEI messages assist in processes related to decoding, display or other purposes, however, DCI and SEI messages may not be required for constructing the luma or chroma samples according to a decoding process. In ITU-T H.266, DCI and SEI messages may be signaled in a bitstream using non-VCL NAL units. Further, DCI and SEI messages may be conveyed by some mechanism other than by being present in the bitstream (i.e., signaled out-of-band).

Figure 3:
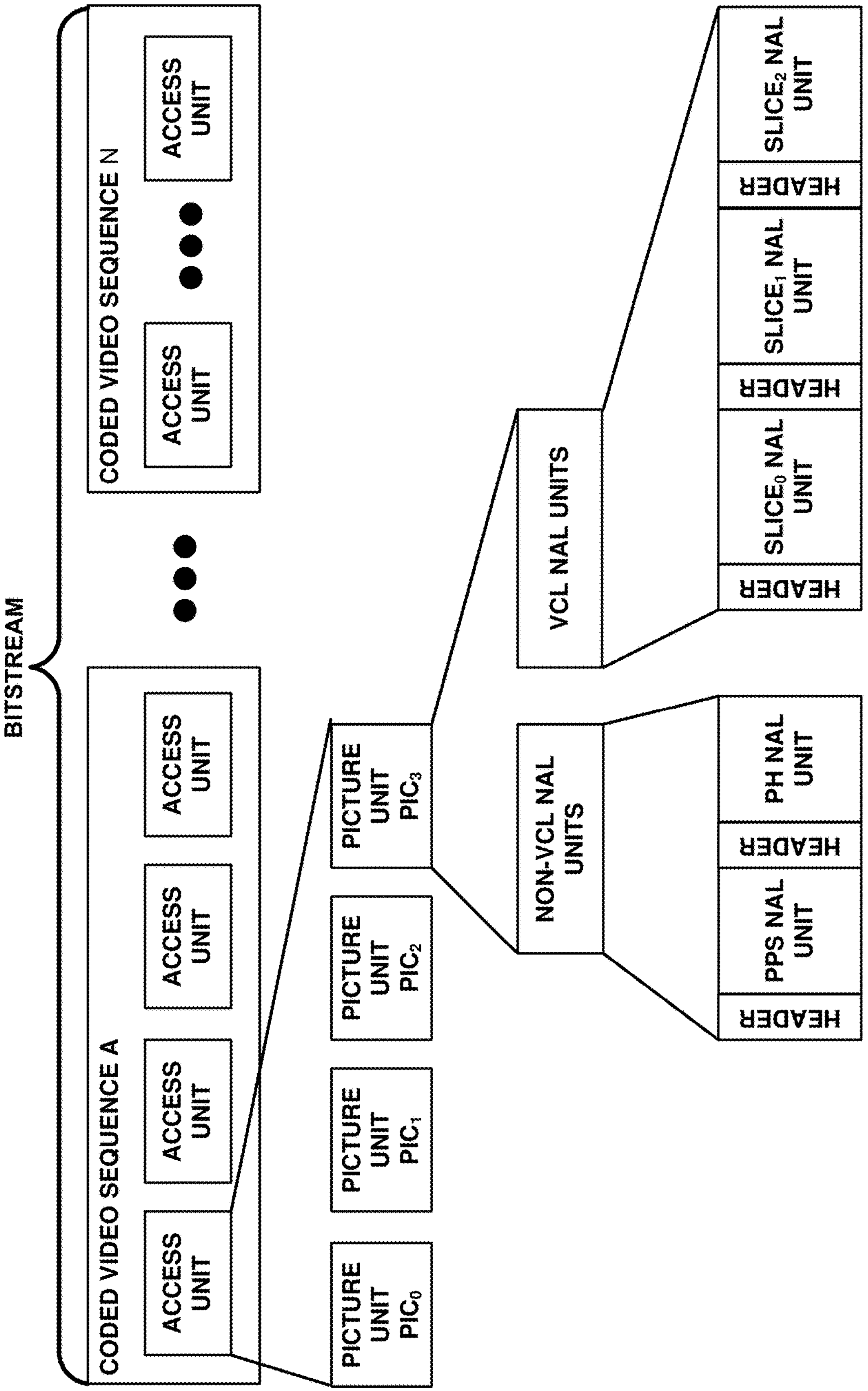
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for $Pic_3$ includes the three VCL NAL coded slice NAL units, i.e., $Slice_0$ NAL unit, $Slice_1$ NAL unit, and $Slice_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units, VPS NAL units, SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism. In ITU-T H.266, a PH syntax structure may be present in the slice header of a VCL NAL unit or in a PH NAL unit of the current PU.

With respect to the equations used herein, the following arithmetic operators may be used:

+ Addition

− Subtraction

* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

x/y Used to denote division in mathematical equations where no truncation or rounding is intended.

Further, the following mathematical functions may be used:

Log 2(x) the base-2 logarithm of x;

$$\mathrm{Min}(x, y) = \begin{cases} x; & x <= y \\ y; & x > y \end{cases};$$

$$\mathrm{Max}(x, y) = \begin{cases} x; & x >= y \\ y; & x < y \end{cases}$$

Ceil(x) the smallest integer greater than or equal to x.

With respect to the example syntax used herein, the following definitions of logical operators may be applied:

x && y Boolean logical "and" of x and y x||y Boolean logical "or" of x and y

Boolean logical "not"

x ? y : z If x is TRUE or not equal to 0, evaluates to the value of y; otherwise, evaluates to the value of z.

Further, the following relational operators may be applied:

> Greater than

>= Greater than or equal to

< Less than

<= Less than or equal to

== Equal to

!= Not equal to

Further, it should be noted that in the syntax descriptors used herein, the following descriptors may be applied:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

se(v): signed integer 0-th order Exp-Golomb-coded syntax element with the left bit first.

tb(v): truncated binary using up to max Val bits with max Val defined in the semantics of the symtax element.

tu(v): truncated unary using up to max Val bits with max Val defined in the semantics of the symtax element.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

st(v): null-terminated string encoded as universal coded character set (UCS) transmission format-8 (UTF-8) characters as specified in ISO/IEC 10646. The parsing process is specified as follows: st(v) begins at a byte-aligned position in the bitstream and reads and returns a series of bytes from the bitstream, beginning at the current position and continuing up to but not including the next byte-aligned byte that is equal to 0x00, and advances the bitstream pointer by (stringLength+1)*8 bit positions, where stringLength is equal to the number of bytes returned.

As described above, ITU-T H.266 defines NAL unit header semantics that specify the type of Raw Byte Sequence Payload (RBSP) data structure included in the NAL unit. Table 1 illustrates the syntax of the NAL unit header provided in ITU-T H.266.

TABLE 1

| | Descriptor |
|---|---|
| nal_unit_header( ) { | |
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

ITU-T H.266 provides the following definitions for the respective syntax elements illustrated in Table 1.

forbidden_zero_bit shall be equal to 0.

nuh_reserved_zero_bit shall be equal to 0. The value 1 of nuh_reserved_zero_bit could be specified in the future by ITU-T|ISO/IEC. Although the value of nuh_reserved_zero_bit is required to be equal to 0 in this version of this Specification, decoders conforming to this version of this Specification shall allow the value of nuh_reserved_zero_bit equal to 1 to appear in the syntax and shall ignore (i.e. remove from the bitstream and discard) NAL units with nuh_reserved_zero_bit equal to 1.

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC. Although the value of nuh_layer_id is required to be the range of 0 to 55, inclusive, in this version of this Specification, decoders conforming to this version of this Specification shall allow the value of nuh_layer_id to be greater than 55 to appear in the syntax and shall ignore (i.e. remove from the bitstream and discard) NAL units with nuh_layer_id greater than 55.

The value of nuh_layer_id shall be the same for all VCL NAL units of a coded picture. The value of nuh_layer_id of a coded picture or a PU is the value of the nuh_layer_id of the VCL NAL units of the coded picture or the PU.

When nal_unit_type is equal to PH_NUT, or FD_NUT, nuh_layer_id shall be equal to the nuh_layer_id of associated VCL NAL unit.

When nal_unit_type is equal to EOS_NUT, nuh_layer_id shall be equal to one of the nuh_layer_id values of the layers present in the CVS.

NOTE—The value of nuh_layer_id for DCI, OPI, VPS, AUD, and EOB NAL units is not constrained.

nuh_temporal_id_plus1 minus 1 specifies a temporal identifier for the NAL unit.

The value of nuh_temporal_id_plus1 shall not be equal to 0.

The variable TemporalId is derived as follows:

$$TemporalID = \text{nuh\_temporal\_id\_plus1} - 1$$

When nal_unit_type is in the range of IDR_W_RADL to RSV_IRAP_11, inclusive, TemporalId shall be equal to 0.

When nal_unit_type is equal to STSA_NUT and vps_independent_layer_flag[GeneralLayerIdx[nuh_layer_id]] is equal to 1, TemporalId shall be greater than 0.

The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.

The value of TemporalId for non-VCL NAL units is constrained as follows:

If nal_unit_type is equal to DCI_NUT, OPI_NUT, VPS_NUT, or SPS_NUT, TemporalId shall be equal to 0 and the TemporalId of the AU containing the NAL unit shall be equal to 0.

Otherwise, if nal_unit_type is equal to PH_NUT, TemporalId shall be equal to the TemporalId of the PU containing the NAL unit.

Otherwise, if nal_unit_type is equal to EOS_NUT or EOB_NUT, TemporalId shall be equal to 0.

Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.

Otherwise, when nal_unit_type is equal to PPS_NUT, PREFIX_APS_NUT, or SUFFIX_APS_NUT, TemporalId shall be greater than or equal to the TemporalId of the PU containing the NAL unit.

NOTE—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId could be greater than or equal to the TemporalId of the containing AU, as all PPSs and APSs could be included in the beginning of the bitstream (e.g., when they are transported out-of-band, and the receiver places them at the beginning of the bitstream), wherein the first coded picture has TemporalId equal to 0.

nal_unit_type specifies the NAL unit type, i.e., the type of RBSP data structure contained in the NAL unit as specified in Table 2.

NAL units that have nal_unit_type in the range of UNSPEC28 . . . UNSPEC31, inclusive, for which semantics are not specified, shall not affect the decoding process specified in this Specification.

NOTE—NAL unit types in the range of UNSPEC_28 . . . UNSPEC_31 could be used as determined by the application.

No decoding process for these values of nal_unit_type is specified in this Specification. Since different applications might use these NAL unit types for different purposes, particular care is expected to be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the DUs of the bitstream, decoders shall ignore (remove from the bitstream and discard) the contents of all NAL units that use reserved values of nal_unit_type.

NOTE—This requirement allows future definition of compatible extensions to this Specification.

TABLE 2

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7<br>8 | IDR_W_RADL<br>IDR_N_LP | Coded slice of an IDR picture or subpicture* slice_layer_rbsp( ) | VCL |
| 9 | CRA_NUT | Coded slice of a CRA picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit type | VCL |
| 12 | OPI_NUT | Operating point information operating_point_information_rbsp( ) | non-VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17<br>18 | PREFIX_APS_NUT<br>SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23<br>24 | PREFIX_SEI_NUT<br>SUFFIX_SEI_NUT | Supplemental enhancement information sei_rbsp( ) | non-VCL |
| 25 | FD_NUT | Filler data filler_data_rbsp( ) | non-VCL |
| 26<br>27 | RSV_NVCL_26<br>RSV_NVCL_27 | Reserved non-VCL NAL unit types | non-VCL |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

NOTE—A clean random access (CRA) picture may have associated RASL or RADL pictures present in the bitstream.

NOTE—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

The value of nal_unit_type shall be the same for all VCL NAL units of a subpicture. A subpicture is referred to as having the same NAL unit type as the VCL NAL units of the subpicture.

For VCL NAL units of any particular picture, the following applies:

If pps_mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.

Otherwise (pps_mixed_nalu_types_in_pic_flag is equal to 1), all of the following constraints apply:

The picture shall have at least two subpictures.

VCL NAL units of the picture shall have two or more different nal_unit_type values.

There shall be no VCL NAL unit of the picture that has nal_unit_type equal to GDR_NUT.

When a VCL NAL unit of the picture has nal_unit_type equal to nalUnitTypeA that is equal to IDR_W_RADL, IDR_N_LP, or CRA_NUT, other VCL NAL units of the picture shall all have nal_unit_type equal to nalUnitTypeA or TRAIL_NUT.

The value of nal_unit_type shall be the same for all pictures in an IRAP or GDR AU.

When sps_video_parameter_set_id is greater than 0, vps_max_tid_il_ref_pics_plus1[i][j] is equal to 0 for j equal to GeneralLayerIdx[nuh_layer_id] and any value of i in the range of j+1 to vps_max_layers_minus1, inclusive, and pps_mixed_nalu_types_in_pic_flag is equal to 1, the value of nal_unit_type shall not be equal to IDR_W_RADL, IDR_N_LP, or CRA_NUT.

It is a requirement of bitstream conformance that the following constraints apply:

When a picture is a leading picture of an IRAP picture, it shall be a RADL or RASL picture.

When a subpicture is a leading subpicture of an IRAP subpicture, it shall be a RADL or RASL subpicture.

When a picture is not a leading picture of an IRAP picture, it shall not be a RADL or RASL picture.

When a subpicture is not a leading subpicture of an IRAP subpicture, it shall not be a RADL or RASL subpicture.

No RASL pictures shall be present in the bitstream that are associated with an IDR picture.

No RASL subpictures shall be present in the bitstream that are associated with an IDR subpicture.

No RADL pictures shall be present in the bitstream that are associated with an IDR picture having nal_unit_type equal to IDR_N_LP.

NOTE—It is possible to perform random access at the position of an IRAP AU by discarding all PUs before the IRAP AU (and to correctly decode the non-RASL pictures in the IRAP AU and all the subsequent AUs in decoding order), provided each parameter set is available (either in the bitstream or by external means not specified in this Specification) when it is referenced.

No RADL subpictures shall be present in the bitstream that are associated with an IDR subpicture having nal_unit_type equal to IDR_N_LP.

Any picture, with nuh_layer_id equal to a particular value layerId, that precedes an IRAP picture with nuh_layer_id equal to layerId in decoding order shall precede the IRAP picture in output order and shall precede any RADL picture associated with the IRAP picture in output order.

Any subpicture, with nuh_layer_id equal to a particular value layerId and subpicture index equal to a particular value subpicIdx, that precedes, in decoding order, an IRAP subpicture with nuh_layer_id equal to layerId and subpicture index equal to subpicIdx shall precede, in output order, the IRAP subpicture and all its associated RADL subpictures.

Any picture, with nuh_layer_id equal to a particular value layerId, that precedes a recovery point picture with nuh_layer_id equal to layerId in decoding order shall precede the recovery point picture in output order.

Any subpicture, with nuh_layer_id equal to a particular value layerId and subpicture index equal to a particular value subpicIdx, that precedes, in decoding order, a subpicture with nuh_layer_id equal to layerId and subpicture index equal to subpicIdx in a recovery point picture shall precede that subpicture in the recovery point picture in output order.

Any RASL picture associated with a CRA picture shall precede any RADL picture associated with the CRA picture in output order.

Any RASL subpicture associated with a CRA subpicture shall precede any RADL subpicture associated with the CRA subpicture in output order.

Any RASL picture, with nuh_layer_id equal to a particular value layerId, associated with a CRA picture shall follow, in output order, any IRAP or GDR picture with nuh_layer_id equal to layerId that precedes the CRA picture in decoding order.

Any RASL subpicture, with nuh_layer_id equal to a particular value layerId and subpicture index equal to a particular value subpicIdx, associated with a CRA subpicture shall follow, in output order, any IRAP or GDR subpicture, with nuh_layer_id equal to layerId and subpicture index equal to subpicIdx, that precedes the CRA subpicture in decoding order.

If sps_field_seq_flag is equal to 0, the following applies: when the current picture, with nuh_layer_id equal to a particular value layerId, is a leading picture associated with an IRAP picture, it shall precede, in decoding order, all non-leading pictures that are associated with the same IRAP picture. Otherwise (sps_field_seq_flag is equal to 1), let picA and picB be the first and the last leading pictures, in decoding order, associated with an IRAP picture, respectively, there shall be at most one non-leading picture with nuh_layer_id equal to layerId preceding picA in decoding order, and there shall be no non-leading picture with nuh_layer_id equal to layerId between picA and picB in decoding order.

If sps_field_seq_flag is equal to 0, the following applies: when the current subpicture, with nuh_layer_id equal to a particular value layerId and subpicture index equal to a particular value subpicIdx, is a leading subpicture associated with an IRAP subpicture, it shall precede, in decoding order, all non-leading subpictures that are associated with the same IRAP subpicture. Otherwise (sps_field_seq_flag is equal to 1), let subpicA and subpicB be the first and the last leading subpictures, in decoding order, associated with an IRAP subpicture, respectively, there shall be at most one non-leading subpicture with nuh_layer_id equal to layerId and subpicture index equal to subpicIdx preceding subpicA in decoding order, and there shall be no non-leading picture with nuh_layer_id equal to layerId and subpicture index equal to subpicIdx between picA and picB in decoding order.

As provided in Table 2, a NAL unit may include an supplemental enhancement information (SEI) syntax structure. Table 3 and Table 4 illustrate the supplemental enhancement information (SEI) syntax structure provided in ITU-T H.266.

TABLE 3

| | Descriptor |
|---|---|
| sei_rbsp( ) { | |
| do | |
| sei_message( ) | |
| while( more_rbsp_data( ) ) | |
| rbsp_trailing_bits( ) | |
| } | |

TABLE 4

| | Descriptor |
|---|---|
| sei_message( ) { | |
| payloadType = 0 | |
| do { | |
| payload_type_byte | u(8) |
| payloadType += payload_type_byte | |
| } while( payload_type_byte = = 0xFF ) | |
| payloadSize = 0 | |
| do { | |
| payload_size_byte | u(8) |
| payloadSize += payload_size_byte | |
| } while( payload_size_byte = = 0xFF ) | |
| sei_payload( payloadType, payloadSize ) | |
| } | |

With respect to Table 3 and Table 4, ITU-T H.266 provides the following semantics:

Each SEI message consists of the variables specifying the type payloadType and size payloadSize of the SEI message payload. SEI message payloads are specified. The derived SEI message payload size payloadSize is specified in bytes and shall be equal to the number of RBSP bytes in the SEI message payload.

NOTE—The NAL unit byte sequence containing the SEI message might include one or more emulation prevention bytes (represented by emulation_prevention_three_byte syntax elements). Since the payload size of an SEI message is specified in RBSP bytes, the quantity of emulation prevention bytes is not included in the size payloadSize of an SEI payload.

payload_type_byte is a byte of the payload type of an SEI message.

payload_size_byte is a byte of the payload size of an SEI message.

It should be noted that ITU-T H.266 defines payload types for SEI messages. Versatile supplemental enhancement information messages for coded video bitstreams, Rec. ITU-T H.274, May 2022, which is referred to as H.274, defines additional SEI message payload types. Further, "Additional SEI messages for VSEI version 4 (Draft 2)" 34th Meeting of ISO/IEC JTC1/SC29, 17-24 Apr. 2024, Rennes, FR, document JVET-AH2006-v1, which is referred to as JVET-AH2006, defines additional SEI message payload types for future extensions to H.274. For example, JVET-AH2006 provides a text description information SEI message which provides text description about one or more pictures. Table 5 illustrates the text description information SEI message provided in JVET-AH2006.

TABLE 5

| | Descriptor |
|---|---|
| text_description( payloadSize ) { | |
| txt_descr_id | u(14) |
| txt_cancel_flag | u(1) |
| if( !txt_cancel_flag ) { | |
| txt_persistence_flag | u(1) |
| txt_descr_purpose | u(8) |
| txt_num_strings_minus1 | u(8) |
| for( i = 0; i <= txt_num_strings_minus1; i++ ) { | |
| txt_descr_string_lang[ i ] | st(v) |
| txt_descr_string[ i ] | st(v) |
| } | |
| } | |
| } | |

With respect to Table 5, JVET-AH2006 provides the following semantics:

The text description information SEI message provides text description about one or more pictures.

txt_descr_id indicates the identifier value of this text description information SEI message. The value of txt_descr_id shall be in the range of 1 to 16383, inclusive. Value 0 is reserved.

txt_cancel_flag equal to 1 indicates that the text description information SEI message cancels the persistence of any previous text description information SEI message with the same txt_descr_id in output order that applies to the current layer. txt_cancel_flag equal to 0 indicates that text description information follows.

txt_persistence_flag specifies the persistence of the text information description SEI message for the current layer. txt_persistence_flag equal to 0 specifies that the text description information applies to the current decoded picture only.

txt_persistence_flag equal to 1 specifies that the text description information SEI message applies to the current decoded picture and persists for all subsequent pictures of the current layer in output order until one or more of the following conditions are true:

A new CLVS of the current layer begins.

The bitstream ends.

A picture in the current layer in an AU associated with a text description information SEI message with the same txt_descr_id is output that follows the current picture in output order.

txt_descr_purpose indicates the purpose of the text description SEI as specified in Table 6. The value of text_descr_purpose shall be in the range of 0 to 5, inclusive. Values in the range of 6 to 255, inclusive, for text_descr_purpose are reserved for future use by ITU-T|ISO/IEC and shall not be present in bitstreams conforming to this version of this Specification. Decoders conforming to this version of this Specification shall allow any value of text_descr_purpose in the range of 0 to 255, inclusive.

TABLE 6

| Value | Interpretation |
|---|---|
| 0 | Application defined |
| 1 | Copyright information |
| 2 | AI marking information |
| 3 | General comment information |
| 4 | Content advisory rating information conforming to US. And Canadian Rating Region Tables (RRT) |
| 5 | Tag URI for identifying the bitstream |
| 6 . . . 255 | Reserved |

txt_num_strings_minus1 plus 1 indicates the number of entries for txt_descr_string_lang[i] and txt_descr_string[i] that follow.

txt_descr_string_lang[i] specifies the language of the txt_descr_string[i]. The language of the txt_descr_string[i] shall be given by a language tag as defined by IETF RFC 5646. The length of txt_descr_string_lang[i] shall be in the range of 0 to 49, inclusive.

txt_descr_string[i] specifies i-th text description information string whose value is interpreted as specified by the txt_descr_purpose.

When txt_descr_purpose is equal to 0, the interpretation of what information is conveyed in the txt_descr_string is application-defined.

When txt_descr_purpose is equal to 1, the txt_descr_string[i] specifies copyright information that pertains to the picture(s) in the persistence scope defined by txt_cancel_flag and txt_persistence_flag.

When txt_descr_purpose is equal to 2, the txt_descr_string[i] specifies, when not a null string, AI marking information that pertains to the picture(s) within the persistence scope of this SEI message.

NOTE: When txt_descr_purpose is equal to 2 the string can contain information about the machine-learning-based processing, intended use of the decoded pictures, or other aspects relevant to the associated pictures.

When txt_descr_purpose is equal to 3, the txt_descr_string[i] specifies a general text label description that pertains to the picture(s) in the persistence scope defined by txt_cancel_flag and txt_persistence_flag.

When txt_descr_purpose is equal to 4, the txt_descr_string[i] specifies content advisory rating information conforming to US. And Canadian Rating Region Tables (RRT) that pertains to the picture(s) in the persistence scope defined by txt_cancel_flag and txt_persistence_flag.

When txt_descr_purpose is equal to 5, txt_descr_string[i] contains a tag URI with syntax and semantics as specified in IETF RFC 4151 identifying the CLVS.

According to the techniques herein, in one example, a syntax element that indicates the purpose of the text description information SEI (e.g., txt_descr_purpose) may be positioned in a text description information SEI message such that entities interested in certain purpose values (e.g. copyright or AI marking) can more easily identify these particular text description information SEIs. For example, by enabling the parsing of a purpose syntax element at a particular position without having to do conditional parsing. Further, in one example, according to the techniques herein, a cancel flag may be included in a text description information SEI message. In one example, a cancel flag may cancel persistence of all previous text description information SEIs which have the same purpose as the current text description information SEI message. In one example, according to the techniques herein, a text description information SEI message purpose may include a purpose to indicate and provide textual information regarding photosensitive content, such as, strobe/flashing lights in an image and sequence of images which could cause photosensitive epilepsy.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
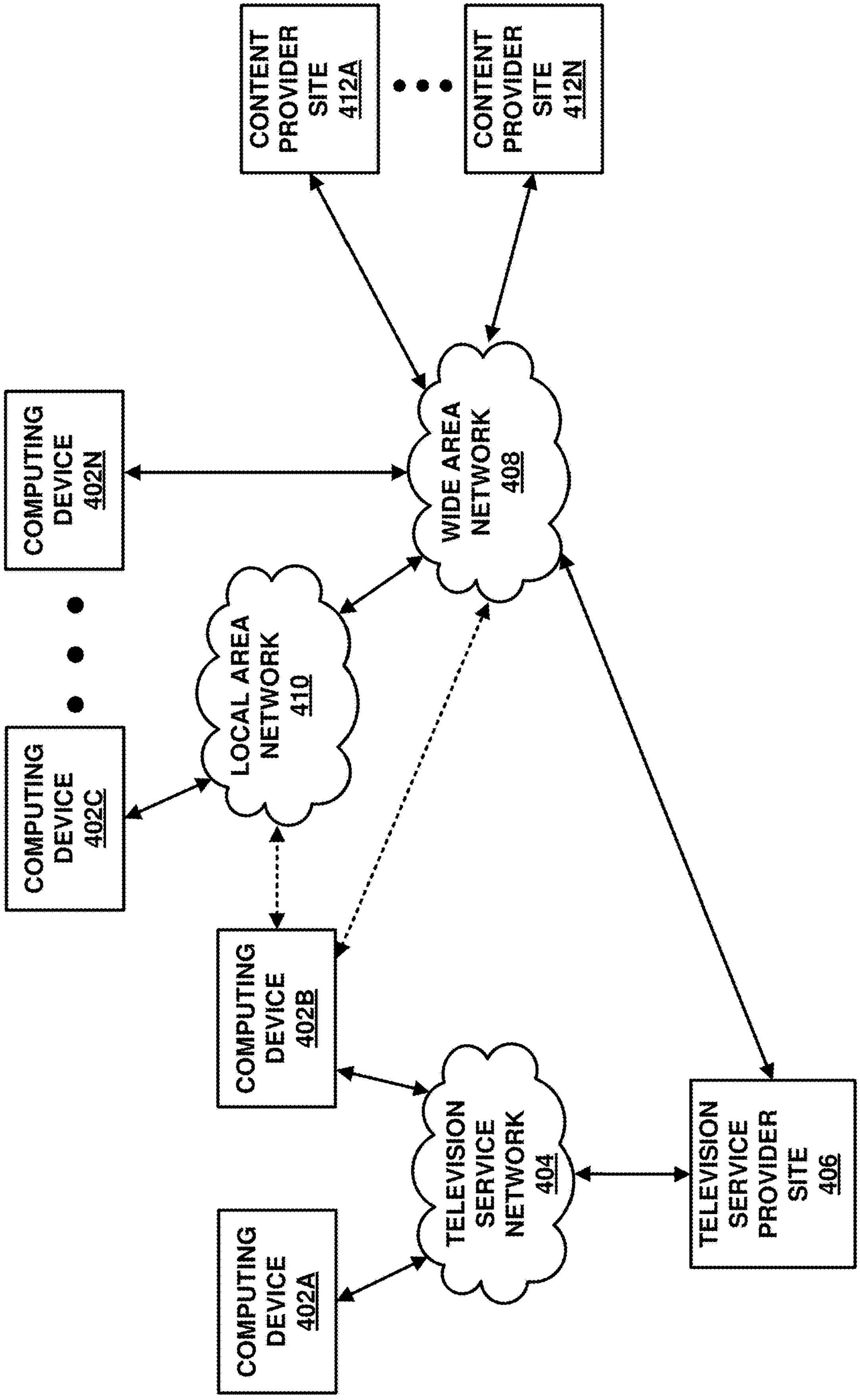
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3$^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
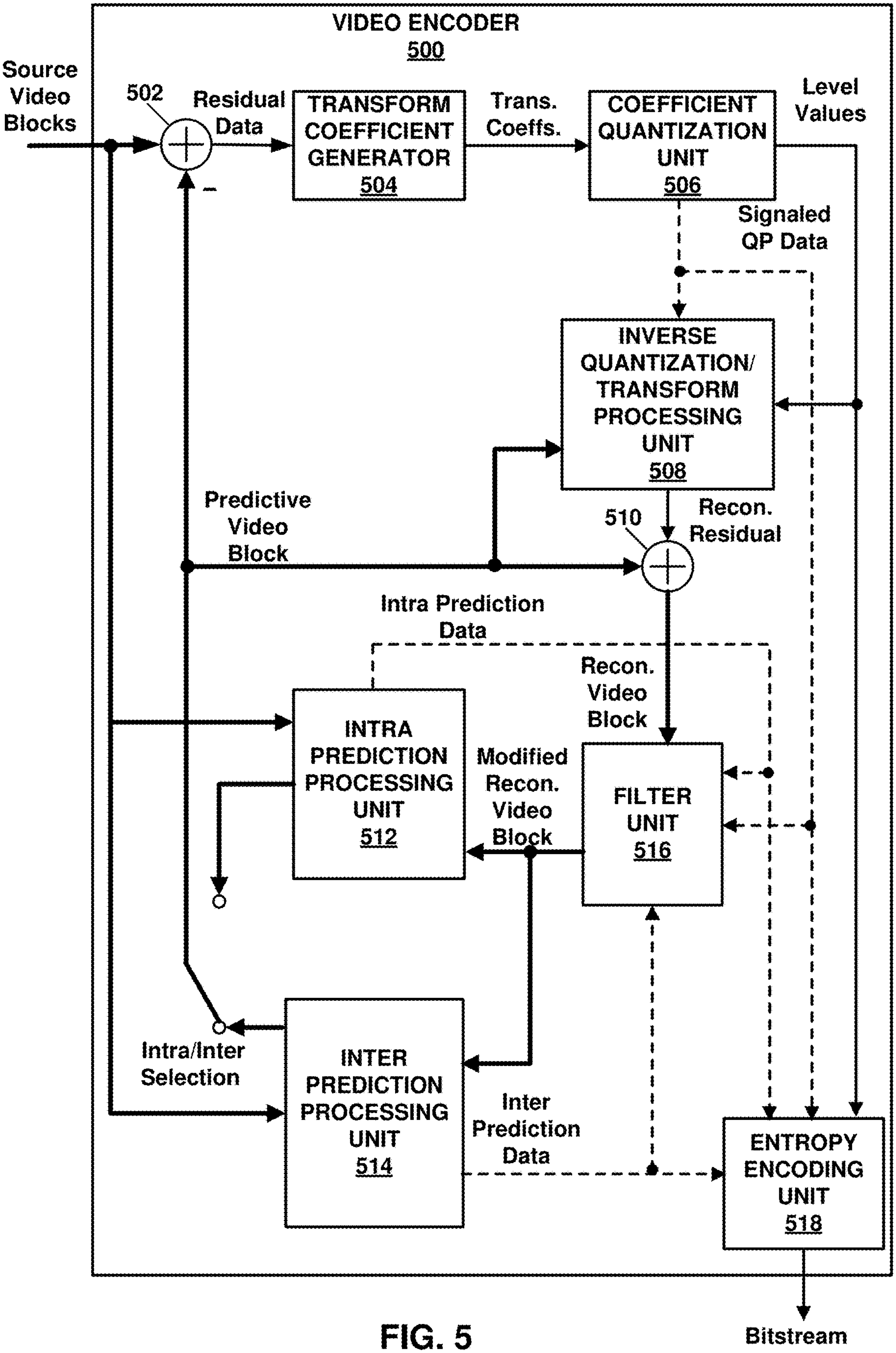
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a compliant bitstream forms a new compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, according to the techniques herein, in one example, a syntax element that indicates the purpose of a text description information SEI message may be positioned in a text description information SEI message such that entities interested in certain purpose values can more easily identify these particular text description information SEIs. In one example, the signaling of syntax element txt_descr_purpose syntax element may occur at an earlier position in a text description information SEI message. As described above, in one example, according to the techniques herein, a cancel flag may be included in text description information SEI message. It is asserted that use of a cancel flag may help a splicing use case, where a new SEI can be inserted after a splice point and cancel the persistence of all previous text description information SEIs having the same txt_descr_purpose, irrespective of the txt_descr_id value of those previous SEIs.

Table 7 illustrates an example of a text description information SEI message according to the techniques herein.

TABLE 7

| | Descriptor |
|---|---|
| text_description( payloadSize ) { | |
| txt_descr_purpose | u(8) |
| txt_cancel_flag | u(1) |
| if( !txt_cancel_flag ) { | |
| txt_descr_id | u(13) |
| txt_id_cancel_flag | u(1) |
| if( !txt_id_cancel_flag ) { | |
| txt_persistence_flag | u(1) |
| txt_num_strings_minus1 | u(8) |
| for( i = 0; i <= txt_num_strings_minus1; i++ ) { | |
| txt_descr_string_lang[ i ] | st(v) |
| txt_descr_string[ i ] | st(v) |
| } | |
| } | |
| } | |
| } | |

With respect to Table 7, in one example, the semantics may be based on the semantics provided above and the following:

txt_cancel_flag equal to 1 indicates that the text description information SEI message cancels the persistence of any previous text description information SEI message with the same txt_descr_purpose in output order that applies to the current layer. txt_cancel_flag equal to 0 indicates that text description information follows.

txt_descr_id indicates the identifier value of this text description information SEI message. The value of txt_descr_id shall be in the range of 1 to 16383, inclusive. Value 0 is reserved.

Text description SEI messages with different values for txt_descr_purpose use separate values spaces for txt_descr_id.

OR

Text description SEI messages with different values for txt_descr_purpose use separate values space for txt_descr_id.

OR

Text description SEI messages with different values of txt_descr_purpose use separate values spaces for txt_descr_id.

OR

Text description SEI messages with different values of txt_descr_purpose use separate values space for txt_descr_id.

OR

The value space of txt_descr_id is separate for each txt_descr_purpose.

OR text_descr_id values are specific for each txt_descr_purpose (i.e. are purpose specific).

txt_id_cancel_flag equal to 1 indicates that the text description information SEI message cancels the persistence of any previous text description information SEI message with the same txt_descr_id value as the current SEI in output order that applies to the current layer. txt_id_cancel_flag equal to 0 indicates that text description information syntax elements (txt_persistence_flag, txt_num_strings_minus1, txt_descr_string_lang[i], txt_descr_string[i]) follow.

OR, in one example:

txt_id_cancel_flag equal to 1 indicates that the text description information SEI message cancels the persistence of any previous text description information SEI message with the same txt_descr_id value and txt_descr_purpose values as those values in the current SEI in output order that applies to the current layer.

txt_id_cancel_flag equal to 0 indicates that text description information syntax elements (txt_persistence_flag, txt_num_strings_minus1, txt_descr_string_lang[i], txt_ descr_string[i]) follow.

txt_descr_string[i] specifies i-th text description information string whose value is interpreted as specified by the txt_descr_purpose.

When txt_descr_purpose is equal to 0, the interpretation of what information is conveyed in the txt_descr_string is application-defined.

When txt_descr_purpose is equal to 1, the txt_descr_ string[i] specifies copyright information that pertains to the picture(s) in the persistence scope of this SEI message.

When txt_descr_purpose is equal to 2, the txt_descr_ string[i] specifies, when not a null string, AI marking information that pertains to the picture(s) within the persistence scope of this SEI message.

NOTE: When txt_descr_purpose is equal to 2 the string can contain information about the machine-learning-based processing, intended use of the decoded pictures, or other aspects relevant to the associated pictures.

When txt_descr_purpose is equal to 3, the txt_descr_ string[i] specifies a general text label description that pertains to the picture(s) in the persistence scope of this SEI message.

When txt_descr_purpose is equal to 4, the txt_descr_ string[i] specifies content advisory rating information conforming to US. And Canadian Rating Region Tables (RRT) that pertains to the picture(s) in the persistence scope of this SEI message.

When txt_descr_purpose is equal to 5, txt_descr_string[i] contains a tag URI with syntax and semantics as specified in IETF RFC 4151 identifying the CLVS.

It should be noted that in Table 7, semantics of txt_cancel_flag apply to txt_descr_purpose, syntax element txt_descr_id is moved to a later position, and an additional syntax element txt_id_cancel_flag is provided.

It should be noted that the example semantics provided above for Table 7 allows a splicing case where a new Text Description Information (TDI) SEI may be added by sending a cancel flag with its own purpose (i.e., txt_descr_purpose and txt_cancel_flag) and then sending another new TDI SEI with the same purpose with any value of txt_descr_id without having to know the previously sent txt_descr_id values for other purposes in any previous TDI SEIs.

As described above, in one example, according to the techniques herein, a text description information purpose may include a purpose to indicate and provide textual information regarding photosensitive content. It has been reported that photosensitive epilepsy occurs in 1 in 4000 of the population. Video sequences can precipitate photosensitive seizures, for example, when the image includes photosensitive content such as strobe/flashing lights. Thus, it is important to enable the identification of photosensitive content. In one example, according to the techniques herein, syntax element txt_descr_purpose equal to a particular value may identify photosensitive content and details about the type of photosensitive content may be specified in the txt_descr_string[i] syntax element in a text description information SEI.

In one example, the semantics of a text description information SEI message may be based on the semantics provided above and the following:

txt_descr_purpose indicates the purpose of the text description SEI as specified in Table 8. The value of text_descr_purpose shall be in the range of 0 to 6, inclusive. Values in the range of 7 to 255, inclusive, for text_descr_purpose are reserved for future use by ITU-T|ISO/IEC and shall not be present in bitstreams conforming to this version of this Specification. Decoders conforming to this version of this Specification shall allow any value of text_descr_purpose in the range of 0 to 255, inclusive.

TABLE 8

| Value | Interpretation |
|---|---|
| 0 | Application defined |
| 1 | Copyright information |
| 2 | AI marking information |
| 3 | General comment information |
| 4 | Content advisory rating information conforming to US. And Canadian Rating Region Tables (RRT) |
| 5 | Tag URI for identifying the bitstream |
| 6 | Photosensitive content information such as strobe light(s) or flashing light(s) |
| 7-255 | Reserved |

txt_descr_string[i] specifies i-th text description information string whose value is interpreted as specified by the txt_descr_purpose.

When txt_descr_purpose is equal to 0, the interpretation of what information is conveyed in the txt_descr_string is application-defined.

When txt_descr_purpose is equal to 1, the txt_descr_ string[i] specifies copyright information that pertains to the picture(s) in the persistence scope of this SEI message.

When txt_descr_purpose is equal to 2, the txt_descr_ string[i] specifies, when not a null string, AI marking information that pertains to the picture(s) within the persistence scope of this SEI message.

NOTE: When txt_descr_purpose is equal to 2 the string can contain information about the machine-learning-based processing, intended use of the decoded pictures, or other aspects relevant to the associated pictures.

When txt_descr_purpose is equal to 3, the txt_descr_ string[i] specifies a general text label description that pertains to the picture(s) in the persistence scope of this SEI message.

When txt_descr_purpose is equal to 4, the txt_descr_ string[i] specifies content advisory rating information conforming to US. And Canadian Rating Region Tables (RRT) that pertains to the picture(s) in the persistence scope of this SEI message.

When txt_descr_purpose is equal to 5, txt_descr_string[i] contains a tag URI with syntax and semantics as specified in IETF RFC 4151 identifying the CLVS.

When txt_descr_purpose is equal to 6, txt_descr_string[i] specifies information about photosensitive content such as strobe light(s) or flashing lights, and severity of the photosensitive content.

Example text strings (i.e. value of txt_descr_string[i] syntax element) in English language when txt_descr_ purpose is equal to 6, may include one or more of the following.

"This scene contains flashing lights which may not be suitable for photosensitive subjects."

"These images include strobe lights which may cause photosensitive epileptic seizures."

"This scene contains car flashing lights in the background."

"This scene includes explosions including flashing light."

It should be noted that above phrases are examples and other similar strings may be signaled in other examples.

It should be noted that although txt_descr_purpose equal to 6 is used in the example above to identify photosensitive content, in other examples, other values may be used.

In another example, a type of SEI message may be used to indicate photosensitive content information. Table 9 illustrates an example of a photosensitive content information SEI message according to the techniques herein.

TABLE 9

| | Descriptor |
|---|---|
| photosensitive_content_information( payloadSize ) { | |
| pci_cancel_flag | u(1) |
| if(!pci_cancel_flag) { | |
| pci_persistence_flag | u(1) |
| pci_severity_idc | u(4) |
| pci_alignment_zero_2bits | u(2) |
| pci_light_types | u(8) |
| pci_num_descr_strings | u(8) |
| for( i= 0; i <= pci_num_descr_strings; i++ ) { | |
| pci_descr_string_lang[ i ] | st(v) |
| pci_descr_string[ i ] | st(v) |
| } | |
| pci_num_rectangles | u(8) |
| for( i = 0; i <= pci_num_rectangles; i++ ) { | |
| pci_rect_top_left_x[ i ] | u(16) |
| pci_rect_top_left_y[ i ] | u(16) |
| pci_rect_width[ i ] | u(16) |
| pci_rect_height[ i] | u(16) |
| } | |
| } | |
| } | |

With respect to Table 9, in one example, the semantics may be based on the following:

The photosensitive content information SEI message provides information regarding photosensitive content such as strobe light(s) or flashing light(s) that may be present in associated pictures.

pci_cancel_flag equal to 1 indicates that the SEI message cancels the persistence of any previous photosensitive content information SEI message in output order. pci_cancel_flag equal to 0 indicates that photosensitive content information follows.

pci_persistence_flag specifies the persistence of the photosensitive content information SEI message for the current layer.

pci_persistence_flag equal to 0 specifies that the photosensitive content information SEI message applies to the current decoded picture only.

pci_persistence_flag equal to 1 specifies that the photosensitive content information SEI message applies to the current decoded picture and persists for all subsequent pictures of the current layer in output order until one or more of the following conditions are true:

A new CLVS of the current layer begins.

The bitstream ends.

A picture in the current layer in an AU associated with a photosensitive content information SEI message is output that follows the current picture in output order.

pci_severity_idc indicates the level of severity of the photosensitive content in the associated decoded picture(s). The values defined are as follows: 0001 indicates low severity, 0010 indicates medium severity, 0011 indicates high severity. Other values are reserved.

pci_alignment_zero_2 bits shall be equal to 0.

pci_light_types indicates the type(s) of lights as specified in Table 10, that are present in the associated decoded picture(s) and that cause photosensitivity. Regarding Table 10, (pci_light_types & bitmask) not equal to 0 indicates that the specified light type is present in the associated decoded pictures and (pci_light_types & bitmask) equal to 0 indicates that the specified light type is not present (or may not be present) in the associated decoded pictures. When pci_light_types is equal to 0, the information regarding types of lights is not specified.

TABLE 10

| bitMask | Interpretation |
|---|---|
| 0x01 | Flashing lights |
| 0x02 | Strobe lights |
| 0x04 | Fireworks |
| 0x08 | Explosion lights |

pci_num_descr_strings indicates the number of entries for pci_descr_string_lang[i] and pci_descr_string[i] that follow.

pci_descr_string_lang[i] specifies the language of the pci_descr_string[i]. The language of the pci_descr_string[i] shall be given by a language tag as defined by IETF RFC 5646. The length of pci_descr_string_lang[i] shall be in the range of 0 to 49, inclusive.

pci_descr_string[i] specifies text description information about photosensitive content in the associated decoded picture(s).

pci_num_rectangles specifies the number of rectangle syntax elements (pci_rect_top_left_x[i], pci_rect_top_left_y[i], pci_rect_width[i], pci_rect_height[i]) that follow. When pci_num_rectangles is equal to 0, the photosensitive content information provided in the SEI message applies to the entire associated decoded picture(s). When pci_num_rectangles is not equal to 0 only each of the specified rectangles in the associated decoded picture(s) include photosensitive content information.

pci_rect_top_left_x[i] and pci_rect_top_left_y[i] respectively specify the luma sample position in horizontal and vertical pixel coordinates indicating the top left corner of the i-th rectangle which includes photosensitive content in the associated decoded picture(s). pci_rect_top_left_x[i] shall be less than CroppedWidth and pci_rect_top_left_y[i] shall be less than CroppedHeight.

pci_rect_width[i] specifies the width of the i-th rectangle which includes photosensitive content in the associated decoded picture(s). pci_rect_width[i] shall be less than or equal to (CroppedWidth−pci_rect_top_left_x[i]).

pci_rect_height[i] specifies the height of the i-th rectangle which includes photosensitive content in the associated decoded picture(s). pci_rect_height[i] shall be less than or equal to (CroppedHeight−pci_rect_top_left_y[i]).

In one example, a SEI message used to indicate photosensitive content information may specify a single rectangle area that encompasses all the photosensitive content in the associated decoded pictures. Table 11 illustrates an example of a photosensitive content information SEI message according to the techniques herein.

TABLE 11

| | Descriptor |
|---|---|
| photosensitive__content__information( payloadSize ) { | |
| pci__cancel__flag | u(1) |
| if(!pci__cancel__flag) { | |
| pci__persistence__flag | u(1) |
| pci__severity__idc | u(4) |
| pci__alignment__zero__2bits | u(2) |
| pci__light__types | u(8) |
| pci__num__descr__strings | u(8) |
| for( i = 0; i <= pci__num__descr__strings; i++ ) { | |
| pci__descr__string__lang[ i ] | st(v) |
| pci__descr__string[ i ] | st(v) |
| } | |
| pci__rectangle__info__present__flag | u(1) |
| if(pci__rectangle__info__present__flag) { | |
| pci__rect__top__left__x | u(16) |
| pci__rect__top__left__y | u(16) |
| pci__rect__width | u(16) |
| pci__rect__height | u(16) |
| } | |
| } | |
| } | |

With respect to Table 11, in one example, the semantics may be based on the semantics provided above and the following:

pci_rectangle_info_present_flag equal to 0 specifies that the photosensitive content information provided in the SEI message applies to the entire associated decoded picture(s). pci_rectangle_info_present_flag equal to 1 specifies the rectangle syntax elements (pci_rect_top_left_x, pci_rect_top_left_y, pci_rect_width, pci_rect_height) follow. When pci_rectangle_info_present_flag is equal to 1, only the specified rectangle defined by (pci_rect_top_left_x, pci_rect_top_left_y, pci_rect_width, pci_rect_height) in the associated decoded picture(s) include photosensitive content information.

pci_rect_top_left_x and pci_rect_top_left_y respectively specify the luma sample position in horizontal and vertical pixel coordinates indicating the top left corner of the rectangle which includes photosensitive content in the associated decoded picture(s). pci_rect_top_left_x shall be less than CroppedWidth and pci_rect_top_left_y shall be less than CroppedHeight.

pci_rect_width specifies the width of the rectangle which includes photosensitive content in the associated decoded picture(s). pci_rect_width shall be less than or equal to (CroppedWidth−pci_rect_top_left_x).

pci_rect_height specifies the height of the rectangle which includes photosensitive content in the associated decoded picture(s). pci_rect_height shall be less than or equal to (CroppedHeight−pci_rect_top_left_y).

In one example, a SEI message used to indicate photosensitive content information may include various syntax elements for each rectangle. Table 12 illustrates an example of a photosensitive content information SEI message according to the techniques herein.

TABLE 12

| | Descriptor |
|---|---|
| photosensitive__content__information( payloadSize ) { | |
| pci__cancel__flag | u(1) |
| if(!pci__cancel__flag) { | |
| pci__persistence__flag | u(1) |
| pci__num__rectangles | u(6) |
| for( i = 0; i <= pci__num__rectangles; i++ ) { | |
| pci__rect__top__left__x[ i ] | u(16) |
| pci__rect__top__left__y[ i ] | u(16) |
| pci__rect__width[ i ] | u(16) |
| pci__rect__height[ i ] | u(16) |
| pci__severity__idc[ i ] | u(4) |
| pci__alignment__zero__4bits | u(4) |
| pci__light__types[ i ] | u(8) |
| pci__num__descr__strings[ i ] | u(8) |
| for( j = 0; j <= pci__num__descr__strings[ i ]; i++ ) { | |
| pci__descr__string__lang[ i ][ j ] | st(v) |
| pci__descr__string[ i ][ j ] | st(v) |
| } | |
| } | |
| } | |
| } | |

With respect to Table 12, in one example, the semantics may be based on the semantics provided above and the following:

pci_severity_idc[i] indicates the level of severity of the photosensitive content in the j-th rectangle area in the associated decoded picture(s). The values defined are as follows: 0001 indicates low severity, 0010 indicates medium severity, 0011 indicates high severity. Other values are reserved.

pci_alignment_zero_4 bits shall be equal to 0.

pci_light_types[i] indicates the type(s) of lights as specified in Table 13, that are present in the associated decoded picture(s) and that cause photosensitivity. Regarding Table 13, (pci_light_types[i] & bitmask) not equal to 0 indicates that the specified light type is present in the i-th rectangle in the associated decoded pictures and (pci_light_types[i] & bitmask) equal to 0 indicates that the specified light type is not present (or may not be present) in the i-th rectangle in the associated decoded pictures. When pci_light_types[i] is equal to 0, the information regarding types of lights is not specified for the i-th rectangle in the associated decoded picture(s).

TABLE 13

| bitMask | Interpretation |
|---|---|
| 0x01 | Flashing lights |
| 0x02 | Strobe lights |
| 0x04 | Fireworks |
| 0x08 | Explosion lights |

pci_num_descr_strings[i] indicates the number of entries for pci_descr_string_lang[i][j] and pci_descr_string[i][j] that follow.

pci_descr_string_lang[i][j] specifies the language of the pci_descr_string[i][j]. The language of the pci_descr_string[i] shall be given by a language tag as defined by IETF RFC 5646. The length of pci_descr_string_lang[i][j] shall be in the range of 0 to 49, inclusive.

pci_descr_string[i][j] specifies j-th string text description information about photosensitive content in the i-th rectangle area in the associated decoded picture(s).

In one example, a syntax element may be included in a photosensitive content information SEI message to specify the number of flashes per second for the flashing light in the associated pictures. For example, the syntax element may be present for light type indicating flashing lights.

In one example, a SEI message used to indicate photosensitive content information may not include the rectangle(s) information syntax elements and the photosensitive content information may apply to the entire associated decoded picture(s). Table 14 illustrates an example of a photosensitive content information SEI message according to the techniques herein.

TABLE 14

| | Descriptor |
|---|---|
| photosensitive__content__information( payloadSize ) { | |
| pci__cancel__flag | u(1) |
| if(!pci__cancel__flag) { | |
| pci__persistence__flag | u(1) |
| pci__severity__idc | u(4) |
| pci__alignment__zero__2bits | u(2) |
| pci__light__types | u(8) |
| pci__num__descr__strings | u(8) |
| for( i = 0; i <= pci__num__descr__strings; i++ ) { | |
| pci__descr__string__lang[ i ] | st(v) |
| pci__descr__string[ i ] | st(v) |
| } | |
| } | |
| } | |

With respect to Table 14, in one example, the semantics may be based on the semantics provided above and the following:

pci_cancel_flag equal to 1 indicates that the SEI message cancels the persistence of any previous photosensitive content information SEI message in output order. pci_cancel_flag equal to 0 indicates that photosensitive content information follows.

pci_persistence_flag specifies the persistence of the photosensitive content information SEI message for the current layer.

pci_persistence_flag equal to 0 specifies that the photosensitive content information SEI message applies to the current decoded picture only.

pci_persistence_flag equal to 1 specifies that the photosensitive content information SEI message applies to the current decoded picture and persists for all subsequent pictures of the current layer in output order until one or more of the following conditions are true:

A new CLVS of the current layer begins.

The bitstream ends.

A picture in the current layer in an AU associated with a photosensitive content information SEI message is output that follows the current picture in output order.

pci_severity_idc indicates the level of severity of the photosensitive content in the associated decoded picture(s). The values defined are as follows: 0001 indicates low severity, 0010 indicates medium severity, 0011 indicates high severity. Other values are reserved.

pci_alignment_zero_2 bits shall be equal to 0.

pci_light_types indicates the type(s) of lights as specified in Table 13, that are present in the associated decoded picture(s) and that cause photosensitivity. Regarding Table 13, (pci_light_types & bitmask) not equal to 0 indicates that the specified light type is present in the associated decoded pictures and (pci_light_types & bitmask) equal to 0 indicates that the specified light type is not present (or may not be present) in the associated decoded pictures. When pci_light_types is equal to 0, the information regarding types of lights is not specified.

pci_num_descr_strings indicates the number of entries for pci_descr_string_lang[i] and pci_descr_string[i] that follow.

pci_descr_string_lang[i] specifies the language of the pci_descr_string[i]. The language of the pci_descr_string[i] shall be given by a language tag as defined by IETF RFC 5646. The length of pci_descr_string_lang[i] shall be in the range of 0 to 49, inclusive.

pci_descr_string[i] specifies text description information about photosensitive content in the associated decoded picture(s).

In one example, as a further simplification, the syntax element pci_severity_idc may not be signaled and, in one example, instead, those 4 bits may be signaled as alignment zero bits.

Further, in one example, the overall syntax structure of a photosensitive content information SEI message may be further simplified by assigning 6 bits to syntax element pci_light_types and removing other alignment zero bits, for example, as follows in Table 15.

TABLE 15

| | Descriptor |
|---|---|
| photosensitive__content__information( payloadSize ) { | |
| pci__cancel__flag | u(1) |
| if(!pci__cancel__flag) { | |
| pci__persistence__flag | u(1) |
| pci__light__types | u(6) |
| pci__num__descr__strings | u(8) |
| for( i = 0; i <= pci__num__descr__strings; i++ ) { | |
| pci__descr__string__lang[ i ] | st(v) |
| pci__descr__string[ i ] | st(v) |
| } | |
| } | |
| } | |

With respect to Table 15, in one example, the semantics may be based on the semantics provided above.

Further, in one example, the overall syntax structure of a photosensitive content information SEI message may be further modified using two bits for syntax element pci_severity_idc and four bits for syntax element pci_light_types and removing other alignment zero bits, for example, as follows in Table 16.

TABLE 16

| | Descriptor |
|---|---|
| photosensitive__content__information( payloadSize ) { | |
| pci__cancel__flag | u(1) |
| if(!pci__cancel__flag) { | |
| pci__persistence__flag | u(1) |
| pci__severity__idc | u(2) |
| pci__light__types | u(4) |
| pci__num__descr__strings | u(8) |
| for( i = 0; i <= pci__num__descr__strings; i++ ) { | |
| pci__descr__string__lang[ i ] | st(v) |
| pci__descr__string[ i ] | st(v) |
| } | |
| } | |
| } | |

With respect to Table 16, in one example, the semantics may be based on the semantics provided above and the following:

pci_severity_idc indicates the level of severity of the photosensitive content in the associated decoded picture(s). The values defined are as follows: 01 indicates low severity, 10 indicates medium severity, 11 indicates high severity. 00 is reserved.

In one example, a number of reserved zero or reserved 1 bits may be included before one or more of the st(v) coded string syntax elements above such that the st(v) coded syntax element starts at a byte-aligned position.

It should be noted that although some syntax elements above are defined using a particular fixed length (e.g. u(8)). In one example, such syntax elements may be defined using a different fixed length, for example, u(12) or u(16) or u(4) or using a variable length coding ue(v).

In this manner, video encoder 500 represents an example of a device configured to signal a text description information message including a first syntax element indicating a purpose of the text description information message, a second syntax element indicating that the text description information message cancels a persistence of a previous text description information message with the same purpose as the text description information message, and conditionally including a third syntax element and a fourth syntax element, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
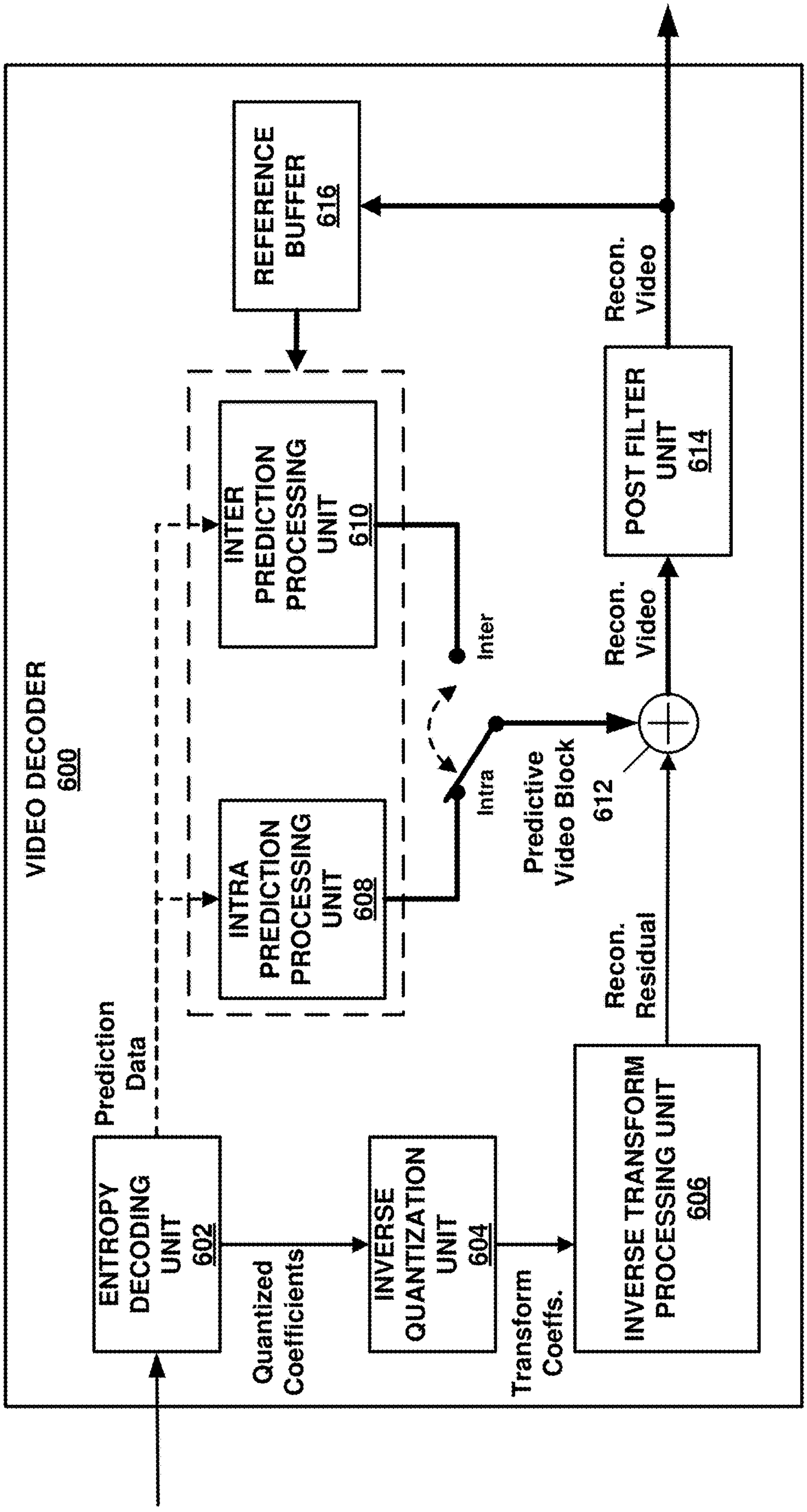
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-16. Video decoder 600 may decode video based on or according to the processes described above, and further based on parsed values in Tables 1-16.

In the example illustrated in FIG. 6, video decoder 600 includes an entropy decoding unit 602, inverse quantization unit 604, inverse transform coefficient processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example illustrated in FIG. 6, inverse quantization unit 604 and inverse transform coefficient processing unit 606 receive quantized coefficient values from entropy decoding unit 602 and output reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to receive a text description information message, parse a first syntax element in the text description information message indicating a purpose of the text description information message, parse a second syntax element in the text description information message indicating that the text description information message cancels a persistence of a previous text description information message with the same purpose as the text description information message, and conditionally parse a third syntax element and a fourth syntax element in the text description information message, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of decoding video data, the method comprising:

receiving a text description information message;

parsing a first syntax element in the text description information message indicating a purpose of the text description information message;

parsing a second syntax element in the text description information message indicating that the text description information message cancels a persistence of a previous text description information message with the same purpose of the text description information message; and conditionally parsing a third syntax element and a fourth syntax element in the text description information message, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

2. A device comprising one or more processors configured to:

receive a text description information message;

parse a first syntax element in the text description information message indicating a purpose of the text description information message;

parse a second syntax element in the text description information message indicating that the text description information message cancels a persistence of a previous text description information message with the same purpose as the text description information message; and conditionally parse a third syntax element and a fourth syntax element in the text description information message, based on the second syntax element indicating that the text description information message does not cancel a persistence of a previous text description information message with the same purpose as the text description information message, wherein the third syntax element indicates an identifier value of the text description information message and a value space of the third syntax element is separate for each purpose, wherein the fourth syntax element indicates that the text description information message cancels a persistence of a previous text description information message with the same identifier value and purpose as the text description information message.

3. The device of claim 2, wherein the device includes a video decoder.

* * * * *